(12) United States Patent
Unbehagen et al.

(10) Patent No.: US 7,480,306 B2
(45) Date of Patent: Jan. 20, 2009

(54) INTERWORKING FUNCTIONALITY

(75) Inventors: Paul Unbehagen, Cary, NC (US); Vasile Radoaca, Burlington, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 706 days.

(21) Appl. No.: 10/742,653

(22) Filed: Dec. 19, 2003

(65) Prior Publication Data

US 2005/0165961 A1    Jul. 28, 2005

(51) Int. Cl.
*H04L 12/28* (2006.01)
(52) U.S. Cl. .................. 370/401; 370/389; 370/469; 370/475
(58) Field of Classification Search ...... 370/389–395.1, 370/401–405, 351, 409, 469, 475
See application file for complete search history.

(56) References Cited

U.S. PATENT DOCUMENTS 6,993,036 B2 * 1/2006 Mizuhara ................. 370/401
7,113,512 B1 * 9/2006 Holmgren et al. ...... 370/395.53
7,400,647 B1 * 7/2008 Cimino et al. ............. 370/466
2001/0009550 A1 * 7/2001 Mizuhara ................. 370/393

OTHER PUBLICATIONS

Shah, H. et al. "ARP Mediation for IP Interworking of Layer 2 VPN", PPVPN Working Group Internet Draft, (Versions 00 01 02) (Jun. 2003).
Shah, H. et al. "ARP Mediation for IP Interworking of Layer 2 VPN", PPVPN Working Group Internet Draft, pp. 1-11, (Versions 00 01 02) (Jun. 2003).

* cited by examiner

*Primary Examiner*—Wing F. Chan
*Assistant Examiner*—Mark A. Mais
(74) *Attorney, Agent, or Firm*—Christopher & Weisberg, P.A.

(57) ABSTRACT

In one aspect a system and method for providing communication between Ethernet and frame relay routers includes generating a unique media access control (MAC) address for a frame relay router in communication with an Ethernet router, associating the MAC address with the frame relay router, and storing the MAC address in an interworking function device (IWF). The method also includes receiving at the IWF device an address resolution protocol (ARP) request from the Ethernet router and sending from the IWF device to the Ethernet router a response to the ARP request based on the stored MAC addresses.

14 Claims, 5 Drawing Sheets

INTERWORKING FUNCTIONALITY

BACKGROUND

Ethernet and frame relay networks operate using different standards and protocols. Ethernet is a local area technology, in which devices attach to a common medium that provides a path along which the signals will travel. Frame relay networks are based on packet-switching technology. In order for an Ethernet network to communicate with a frame relay network an intermediate device (e.g., a device to encapsulate a package) is needed. Encapsulation is the inclusion of one data structure within another structure so that the first data structure is hidden and the network views the encapsulated packet to forward in the system. For example, an Ethernet formatted data packet can be encapsulated within asynchronous transfer mode (ATM) cells to allow packets to be forwarded from an Ethernet network to an ATM network.

SUMMARY

In one aspect a system and method provides communication between Ethernet and a second router having another protocol. The system and method includes generating a unique media access control (MAC) address for the second router in communication with an Ethernet router, associating the MAC address with the second router, and storing the MAC address. The system and method also includes receiving an address resolution protocol (ARP) request from the Ethernet router; and sending to the Ethernet router a response to the ARP request based on the stored MAC addresses.

Embodiments can include one or more of the following. The second router is a frame relay router or an ATM router. The method can include forwarding a packet to the frame relay router from the Ethernet router based on the response from the IWF device.

The method can include sending an inverse address resolution protocol request upon an addition of a new frame relay router. The interworking function device can provide a transparent proxy between the Ethernet router and the frame relay router. The method can include having a virtual socket interface connected to the Ethernet router. The virtual socket interface can be included in the interworking function device and can read the virtual MAC addresses of the frame relay routers.

In another aspect, a system includes a connection to one or more frame relay routers and a connection to an Ethernet router. The system also includes a memory that includes a virtual MAC address for the one or more frame relay routers in communication with the Ethernet router, the device configured to enable the Ethernet router to send data to the frame relay router based on the virtual MAC address.

Embodiments can include one or more of the following. The system can be configured to receive ARP requests from the Ethernet router. The system can be configured to respond to APR requests based on the virtual MAC addresses.

In another aspect, a method includes sending an ARP request from an Ethernet router and receiving a response to the request from an interworking function device. The response is based on a MAC address for a frame relay router stored in the interworking function device. The method also includes forwarding the packet to the frame relay router based on the response.

Embodiments can include one or more of the following. The method can also include generating a unique media access control (MAC) address for the frame relay router connected to the Ethernet router and associating the MAC address with the frame relay router. The method can also include sending an inverse address resolution protocol request upon the addition of a new frame relay router. The interworking function device can provide a transparent proxy between the Ethernet router and the frame relay router.

In another aspect a computer program product, is tangibly embodied in an information carrier, for executing instructions on a processor. The computer program product is operable to cause a machine to generate a unique media access control (MAC) address for a frame relay router connected to an Ethernet router, associate the MAC address with the frame relay router, and store the MAC address in an interworking function device (IWF). The product is also configured to receive at the IWF device an address resolution protocol (ARP) request from the Ethernet router and send from the IWF device to the Ethernet router a response to the ARP request based on the stored MAC addresses.

Embodiments can include one or more of the following. The method can include forwarding a packet to a frame relay router from the Ethernet router based on the response from the interworking function device. The method can include sending an inverse address resolution protocol request upon the addition of a new frame relay router. The interworking function device can provide a transparent proxy between the Ethernet router and the frame relay router.

In one aspect, the interworking function (IWF) device allows transparent communication between an Ethernet network and a frame relay network. The IWF device stores a list of media access control addresses for each frame relay connection and responds to ARP requests of the Ethernet network. This allows the Ethernet network to send packets to systems on the frame relay network without first encapsulating the packets.

In another aspect, the assignment of "Virtual" MAC address per ATM/FR virtual connection means that just one Ethernet identifier (VLAN or Ethernet MPLS Pseudo-wire) is required towards the Ethernet "Headquarter" for a set of ATM/FR virtual connections. This translates can provide one or more of the advantages that follow. This method can allow optimized migration to Ethernet for certain types of existing ATM/FR VPNs, for example, where the enterprise customer point router based in the Hub site employs Group Mode/Point to Multipoint configurations. This also can allow lower operational expenses for a both service provider and enterprise customers subscribing to this service. The system can include increased scalability and stability in the Ethernet portion of the network.

DESCRIPTION

Figure 1:
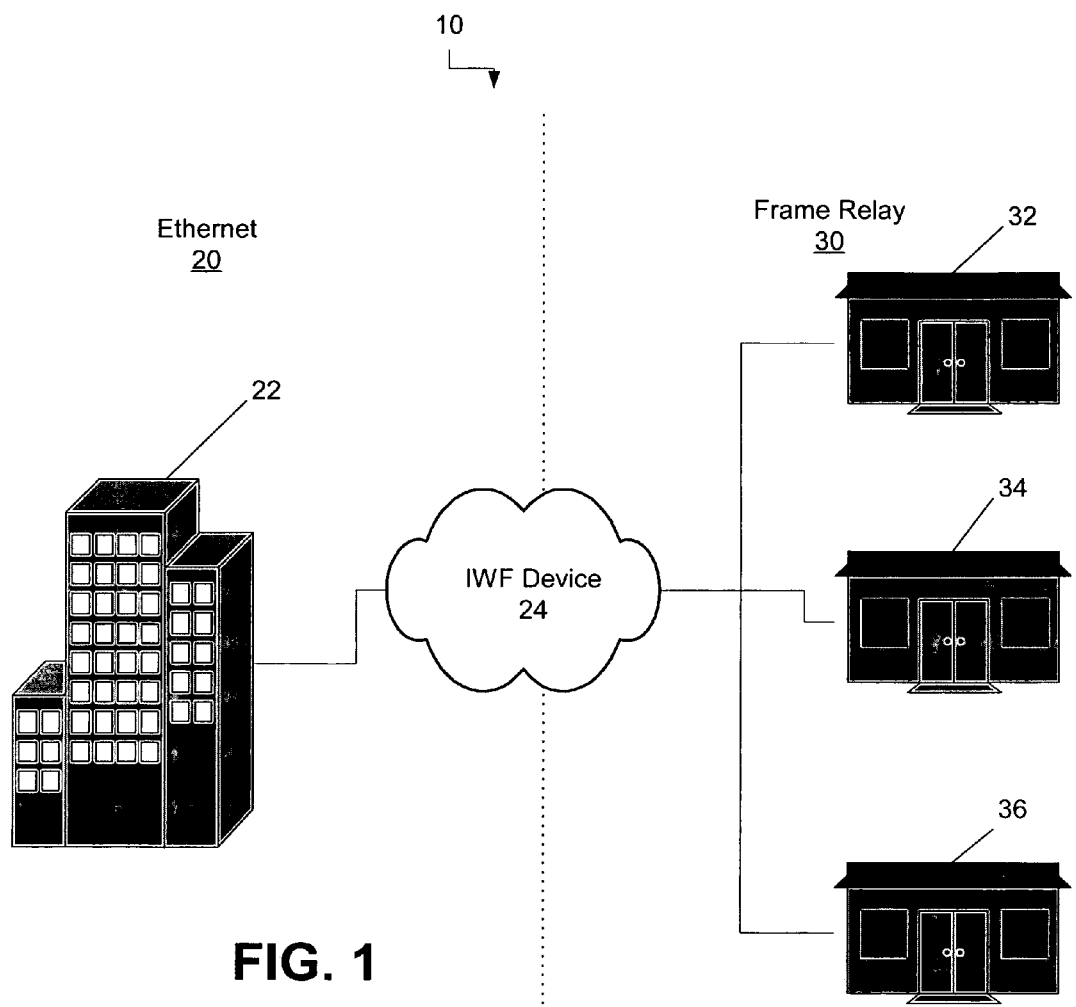
FIG. 1 is a diagram of a system including Ethernet and frame relay networks.

Referring to FIG. 1, a network 10 includes an Ethernet based network 20 and a frame relay based network 30 connected by an interworking function (IWF) device 24. The Ethernet based network 20 includes, for example, a headquarter site 22 having one or more Ethernet capable routers that communicate with multiple frame relay based or asynchronous transfer mode (ATM) based customer end (CE) routers. The CE routers could be located at various customer end locations 32, 34, and 36 and included in the frame relay network 30.

The Ethernet routers, for example, the multiple routers included in the headquarter site 22, communicate using the specified IEEE 802.3 standard. Ethernet is a local area technology with networks traditionally operating within a close proximity. In an Ethernet network, devices attach to a common medium that provides a path along which the signals will travel. This medium can be been coaxial copper cable, a twisted pair, fiber optic cabling, and the like. Devices that attach to the common medium are referred to as stations or nodes. The stations or nodes communicate using short messages called frames, which are variably sized chunks of information. The Ethernet protocol specifies a set of rules for constructing frames. There are explicit minimum and maximum lengths for frames, and a set of required information that appears in the frame. Each frame includes, for example, both a destination address and a source address, which identify the recipient and the sender of the message. The address uniquely identifies the node and no two Ethernet devices should have the same address.

The example below is discussed in terms of a Frame Relay network but the IWF principles also apply for an ATM network.

The frame relay network 30 in system 10 is a type of point-to-point network based on packet-switching technology. In a High-level Data Link Control (HDLC) frame relay network, data is sent in HDLC packets, referred to as "frames". In a frame relay network, all circuits (e.g., link between user end points) are permanently assigned and referred to as "permanent virtual circuits". The circuits are known as virtual because they are not electrical circuits where there is a direct electrical connection from end to end. Rather, there is a "logical" connection, or virtual connection, where the data moves from end-to-end, but without a direct electrical circuit. In practice, data from a particular host arrives at the frame relay switch, from the customer equipment, with a particular destination address. The frame relay switch, using its internal lookup table, finds the data a physical port associated with the address and delivers the data to the correct location.

As described above, the Ethernet Router on customer premises (building 22) is directly connected to the IWF. Similarly, the Routers on the frame relay side are directly connected to the IWF. However, in both cases, in between the device containing the IWF and the customer locations (either on the Ethernet or FR/ATM side) one may use different transport services/method to carry to carry the Ethernet or FR/ATM packets/cells. An example of such a transport service could be Multi-Protocol Label Switching (MPLS) services: i.e. "Martini/PWE3" pseudowires.

Figure 2:
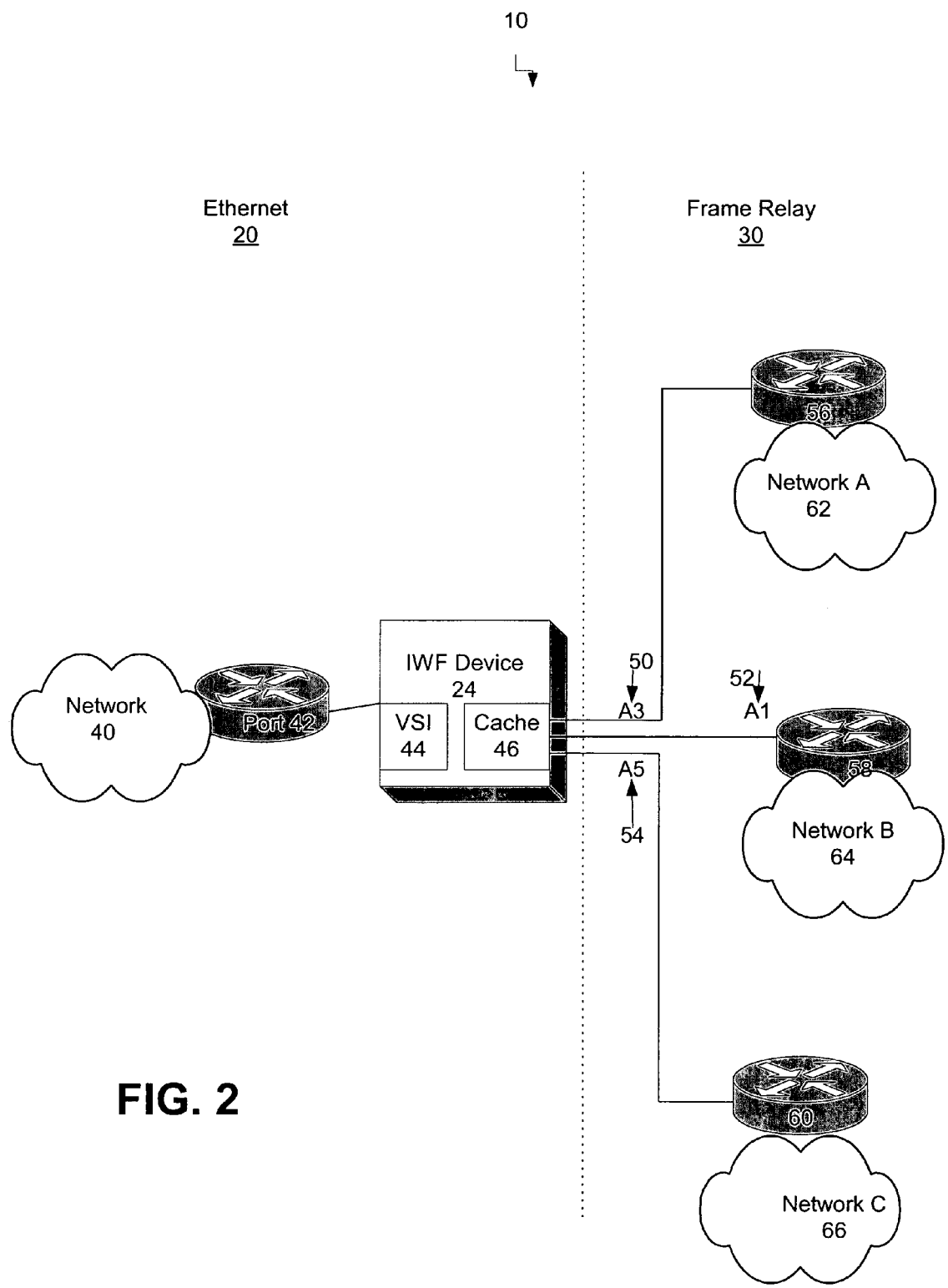
FIG. 2 is a diagram of an interworking device and connections to Ethernet and frame relay networks.

Referring to FIG. 2, an example of a system 10 including an Ethernet network 20 and a frame relay network 30 with an IWF device 24 functioning as an interface between the Ethernet network 20 and frame relay network 30 is shown. The Ethernet network includes a network 40 connected to a port 42. The IWF device 24 connects port 42 to multiple frame relay ports 56, 58, and 60 for frame relay networks 62, 64, and 66.

Interfaces from the customer end devices in the frame relay network 30 terminate into the IWF device 24. Each port (e.g., ports 56, 58, and 60) is assigned a virtual media access control (MAC) address. MAC addresses are used by Ethernet networks to route packets from one location to another. The virtual MAC addresses for each device are stored in a cache 46 in the IWF device 24. For example, network 62 (connected to port 56) is assigned a MAC address 50 of "A3". Networks 64 and 66 are assigned MAC addresses 52 and 54 of "A1" and "A5" respectively. Inverse ARP requests towards the FR CPE are used (as described in FIG. 6.) to learn the IP addresses from the related CPE Routers which are subsequently mapped to the corresponding MAC addresses assigned by the system (A1 to A5).

Figure 3:
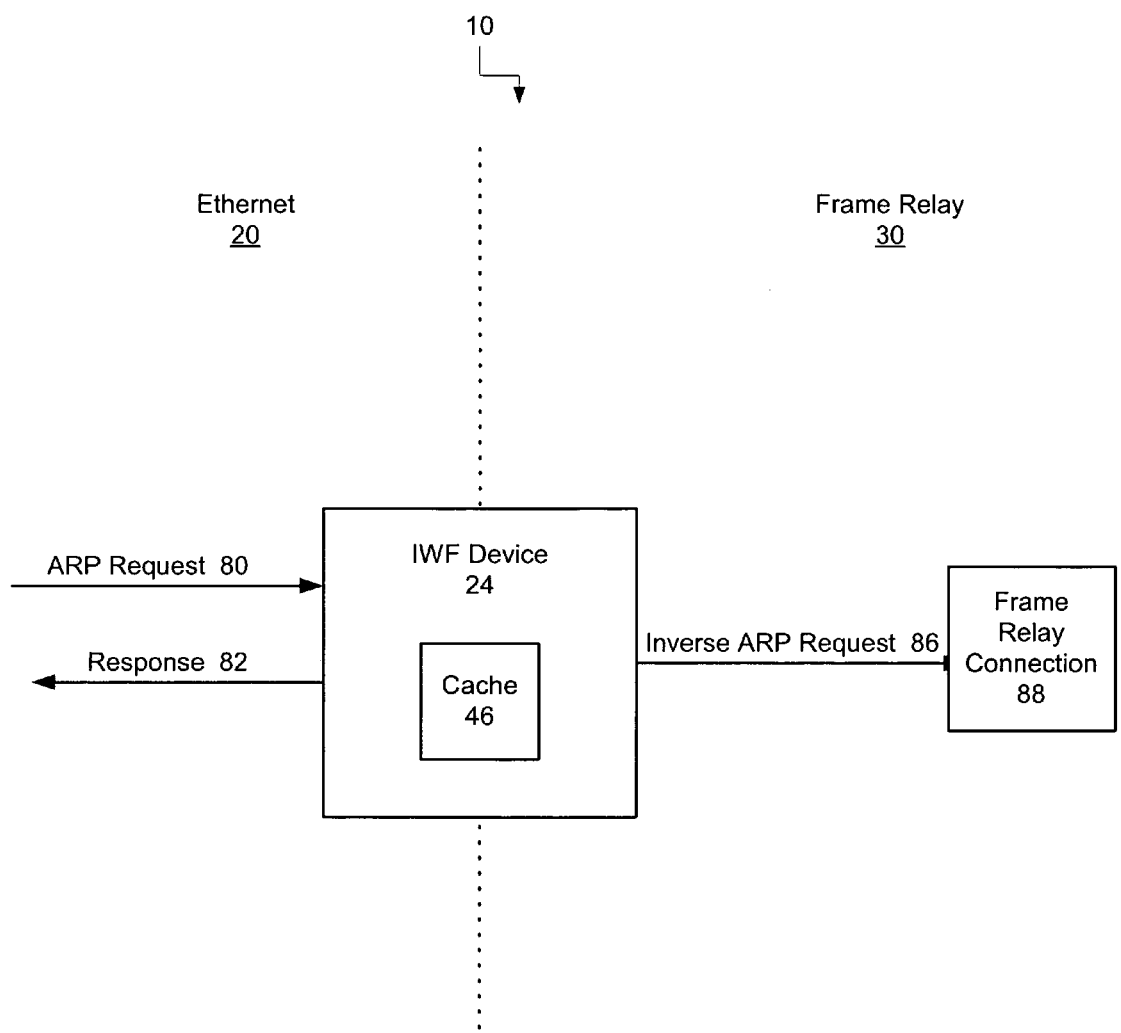
FIG. 3 is a diagram of address resolution protocol requests.

Referring to FIG. 3, the system uses address resolution protocol (ARP) requests to map Internet Protocol address (IP address) to a physical machine address that is recognized in the network. The physical machine address is also known as a Media Access Control or MAC address. A table, usually called the ARP cache 46, maintains a mapping between each MAC address and its corresponding IP address. ARP provides the protocol rules for making the mapping and providing address conversion in both directions.

Figure 4:
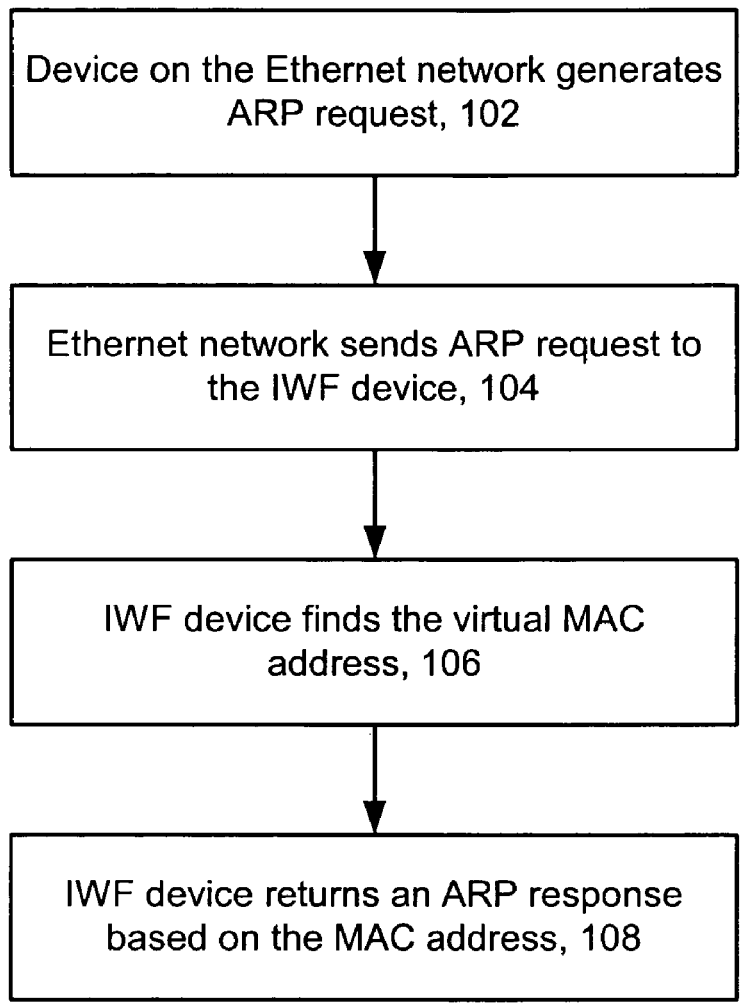
FIG. 4 is a flow chart of a process to send a packet to a system in the frame relay network.

Referring to FIG. 4, when the Ethernet network 20 desires to send a packet to a system in the frame relay network 30, an ARP request 80 is generated 102 and sent 104 to the IWF device 24. The IWF device 24 finds 106 a physical host or MAC address that matches the IP address by looking up the physical host or MAC address in the ARP cache 46. The MAC addresses are associated with the frame relay devices and are stored in cache 46. The IWF 24 device searches the cache 46 and if an matching entry is found returns 108 the entry. This entry is based on the virtual MAC addresses available to the IWF device 24 in cache 46. Since the IWF device 24 responds to the ARP request 80 in the same manner as a port on the Ethernet would respond, the Ethernet network 20 communicates with the IWF device 24 and is not aware that the packets are being sent to a frame relay network 30.

Figure 5:
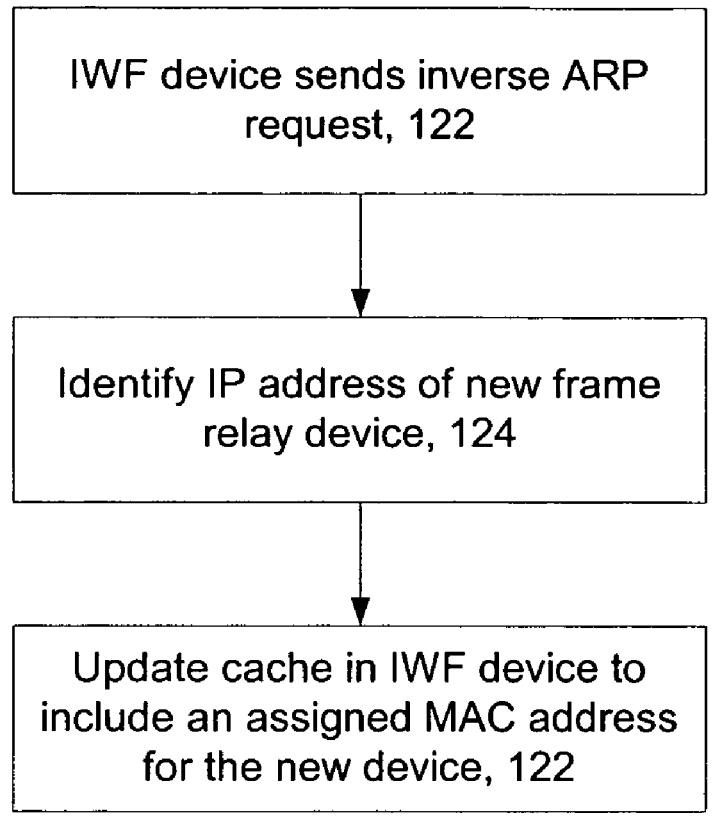
FIG. 5 is a flow chart of processing after addition of a new frame relay connection.

Referring to FIG. 5, upon addition of a new frame relay connection 88, an inverse ARP request 86 is sent 122 from the IWF device 24 to the new frame relay device. This inverse ARP request 86 identifies 124 the IP address of the remote end (e.g., frame relay connection 88). Upon the addition of the new frame relay connection 88, the IWF device 24 updates 126 cache 46 to include the assigned MAC address for the new port.

The device described herein can be implemented in digital electronic circuitry, in computer hardware, firmware, software, or in combinations of them. The device described herein can be implemented as a computer program product, e.g., a computer program tangibly embodied in an information carrier, e.g., in a machine-readable storage device or in a propagated signal, for execution by, or to control the operation of, data processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

A number of embodiments of the invention have been described. Nevertheless, it will be understood that various modifications may be made without departing from the spirit and scope of the invention. Accordingly, other embodiments are within the scope of the following claims.

What is claimed is:

1. A method for providing communication between an Ethernet router and a second router having another protocol, the method comprising:

generating a unique media access control (MAC) address for a port corresponding to the second router in communication with the Ethernet router;

associating the MAC address with the port corresponding to the second router;

storing the MAC address in an interworking function (IWF) device;

receiving an address resolution protocol (ARP) request from the Ethernet router; and sending to the Ethernet router a response to the ARP request based on the stored MAC address.

2. The method of claim 1 further comprising forwarding a packet to the second router from the Ethernet router based on the response from the IWF device.

3. The method of claim 1 further comprising sending an inverse address resolution protocol request upon an addition of a new router.

4. The method of claim 1 wherein the second router is a frame relay router.

5. The method of claim 1 the second router is an ATM router.

6. The method of claim 1 wherein the IWF device includes a virtual socket interface connected to the Ethernet router, wherein the virtual socket interface reads the MAC address.

7. A system comprising:

an input port for a connection to a corresponding frame relay router, an input for a connection to an Ethernet router, and control circuitry that is adapted to:

generate a unique media access control (MAC) address for the port corresponding to the frame relay router;

associate the MAC address with the port corresponding to the frame relay router;

store the MAC address in an interworking function (IWF) device;

receive an address resolution protocol (ARP) request from the Ethernet router; and send to the Ethernet router a response to the ARP request based on the stored MAC address.

8. The system of claim 7 further configured to respond to APR requests based on the MAC address.

9. A method comprising:

sending an ARP request from an Ethernet router;

receiving a response to the request from an interworking function device, the response based on a MAC address for a port corresponding to a frame relay router stored in the interworking function device; and forwarding the packet to a frame relay router using another protocol based on the response.

10. The method of claim 9 further comprising:

generating a unique media access control (MAC) address for the port corresponding to the frame relay router connected to the Ethernet router; and associating the MAC address with the port corresponding to the frame relay router.

11. The method of claim 9 further comprising sending an inverse address resolution protocol request upon the addition of a new router.

12. A computer program product, encoded in a computer readable medium, for executing instructions on a processor, the computer program product being operable to cause a machine to:

generate a unique media access control (MAC) address for a port corresponding to a second router in communication with an Ethernet router;

associate the MAC address with the port corresponding to the second router;

store the MAC address in an interworking function (IWF) device;

receive an address resolution protocol (ARP) request from the Ethernet router; and send to the Ethernet router a response to the ARP request based on the stored MAC address.

13. The method of claim 12 further comprising forwarding a packet to the second router from the Ethernet router based on the response.

14. The method of claim 12 further comprising sending an inverse address resolution protocol request upon the addition of a new router.

* * * * *